Dec. 9, 1924.
P. E. TARLTON
AXLE OR SHAFTING GUARD
Filed June 8, 1922
1,519,072
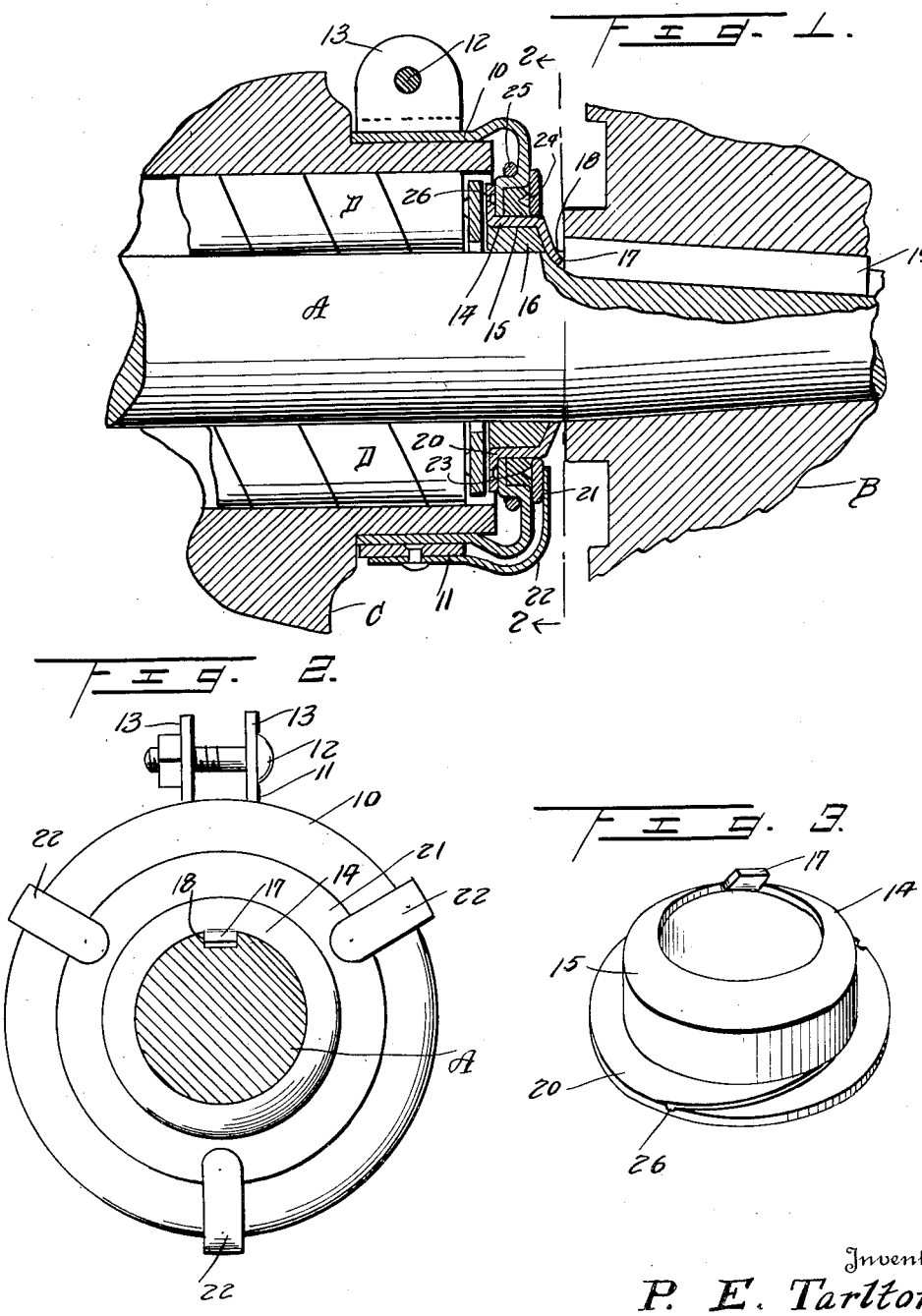
Inventor
P. E. Tarlton, Patented Dec. 9, 1924.

1,519,072

UNITED STATES PATENT OFFICE.

PERLE E. TARLTON, OF LOS ANGELES, CALIFORNIA.

AXLE OR SHAFTING GUARD.

Application filed June 8, 1922. Serial No. 566,743.

*To all whom it may concern:*

Be it known that I, PERLE E. TARLTON, a citizen of the United States, residing at Los Angeles, in the county of Los Angeles and State of California, have invented certain new and useful Improvements in an Axle or Shafting Guard; and I do hereby declare the following to be a full, clear, and exact description of the invention, such as will enable others skilled in the art to which it appertains to make and use the same.

This invention relates to an axle or shafting guard.

It is aimed to provide a construction improved over that disclosed in Letters Patent 1,227,342, issued to me on May 22nd, 1917, and designed to perform the same function namely that of preventing the escape of lubricant intermediate an axle or shaft and its casing or bearing.

It is particularly aimed to provide a novel construction utilizing a flexible cap to be clamped to the casing or housing adjacent one end and to coact with novel means rigid with the axle or shaft at the other end to provide a leak-proof joint, and preferably in combination with novel spring means to assist in rendering said joint efficient.

Another object is to provide means at such a joint or closure which is designed to deflect the passage of oil therethrough and which may consist of one or more grooves arranged to discharge the oil toward its source by centrifugal force.

Additional objects and advantages will become apparent from a consideration of the description following taken in connection with accompanying drawings illustrating one practical emobdiment.

In said drawing:—

Figure 1 is a view principally in vertical central section illustrating the improvement in connection with a vehicle axle, wheel and axle casing or housing;

Figure 2 is a cross sectional view on the line 2—2 of Figure 1, and

Figure 3 is a perspective view of the closure plate employed.

Like reference characters designate like or similar parts in the different views.

Referring specifically to the drawing, an axle or shaft is shown as at A which may be the rear axle of an automobile and thus positively rotated in order to rotate or drive a wheel B keyed thereto. Said shaft A revolves within a casing or housing C. As is usual in such constructions, lubricant is supplied from a point midway of the ends of the axle A toward the wheel, in order to lubricate anti-friction means as at D interposed between the casing C and shaft A. It is the object of this invention to provide a novel and improved means to prevent the escape of such oil or lubricant from between the shaft A and housing C.

In carrying out the invention, a cap is employed at 10, generally of L-shape in cross section and of a suitable flexible material impervious to oil or lubricant as for instance compressed leather. The cap 10 is secured tightly about the housing C in any suitable manner as through the medium of a split clamp 11 adapted to be tightened through the medium of a draw bolt at 12 passing through ears 13 thereon.

A guard plate 14 surrounds the axle A having a band 15 between which and the axle a gasket 16 of felt, leather or other material is interposed. Integral with the band and extending toward the axis of axle A is an anchoring finger 17 adapted to be disposed within the rear end of the groove or the like 18 of the axle which receives a key or spline at 19 to fasten the wheel B on shaft A. Guard plate 14 has an outwardly extending annular flange at 20 against which the inner edge portion of the cap 10 is disposed in order to prevent the escape of lubricant intermediate said flange 20 and the cap. The inner end of the cap 10 is urged into intimate contact with the flange 20 in any suitable manner as by means of a pressure ring 21 which is urged toward the flange 20 through the medium of spring fingers 22 extending from the clamp 11 and overlapping the pressure ring 21. Intermediate the pressure ring 21 and the inner edge portion of the cap 10 is a washer 23 which may be of felt, leather or other flexible material and held in place by spurs 24 extending from the pressure ring 21 and thereinto. The engagement between the inner edge portion of the cap 10 and the washer 23 is increased by the provision of a spring 25, of endless formation and of any suitable construction, being a contractile coil spring or a contractile split wire, or otherwise as preferred.

That face of the flange 20 which is engaged by the cap 10 is provided with one or more grooves as at 26 which serve to collect oil endeavoring to escape intermediate the flange and the cap 10 in contact therewith and discharge the same by centrifugal force toward its source of supply and thus prevent escape thereof.

In use it will be understood that as the wheel B rotates, axle A rotates therewith and also the guard plate 14 in view of its connection to the axle at the lug or finger 17. The cap 10 remains stationary as does the gasket 23 and pressure ring 21. As the ring 18 maintains effective engagement between the cap 10 and flange 20 and such engagement is increased by the spring 25 which also maintains effective engagement between the washer 15 and band 14, lubricant will not escape intermediate the flange 14 and the cap 10. Also lubricant entering the grooves 26 will be expelled therefrom by centrifugal force which will thus serve to keep the lubricant away from the junction of flange 14 with the cap by consequent agitation.

As merely one practical embodiment has been illustrated and described, it is to be understood that changes in the details may be resorted to provided they fall within the spirit and scope of the invention.

Having thus described the invention, what I claim is:—

1. A guard of the class described including a cap, a guard plate, said guard plate having an intermediate band, a gasket positioned under said band and extending about a shaft, a flange on said guard plate against which the cap seats, pressure means about said band to maintain the cap in engagement with said flange including a gasket, a pressure ring having spurs entering said gasket, and spring means to urge said ring towards said flange.

2. A guard of the class described including a cap, a securing clamp for said cap, a guard plate having a flange engageable by said cap, a lug on said plate to enter a groove of an axle, a pressure ring surrounding said plate, a gasket intermediate said ring and adjacent portion of the cap, spurs extending from said ring into said gasket, pressure fingers extending from said clamp and engaging said ring, and a contractile spring surrounding said cap and said gasket.

3. A guard of the class described including a guard plate adapted to surround a shaft, said plate having an intermediate band and a flange extending outwardly therefrom, a cap surrounding said band and contacting with said flange, a gasket peripherally overlapped by said cap, said gasket surrounding and contacting with said band, means surrounding the cap to maintain said cap in intimate contact with said gasket and the gasket in intimate contact with said band, and a gasket to directly seat on the shaft surrounded by said band and overlapped at one side by a portion of said plate.

4. A guard of the class described including a guard plate adapted to surround a shaft, said plate having an intermediate band and a flange extending outwardly therefrom, a cap surrounding said band and contacting with said flange, a gasket peripherally overlapped by said cap, said gasket surrounding and contacting with said band, means surrounding the cap to maintain said cap in intimate contact with said gasket and the gasket in intimate contact with said band, a gasket to directly seat on the shaft surrounded by said band and overlapped at one side by a portion of said plate, and a pressure ring surrounding and in contact with said band at the opposite side of the first mentioned gasket to said flange and urging said first mentioned gasket toward said flange.

5. An axle housing, an axle rotatably mounted therein and projecting therefrom, an annular member positioned upon and spaced from said axle and provided with inwardly and outwardly extending flanges, a gasket positioned between said member and axle and contacting with said parts and with the inner side of said inwardly extending flange, a cap secured to said housing and provided with a cylindrical recess having its circular wall provided with an opening for the reception of said annular member, said circular wall contacting with the outer side of said outwardly extending flange, a gasket positioned in said recess and contacting with the walls thereof and with said annular member, and means retaining said last named gasket in place.

In testimony whereof I affix my signature in presence of two witnesses.

PERLE E. TARLTON.

Witnesses:
EARL G. McCUNE,
KINGSLEY L. SMITH